United States Patent [19]
Nilsson

[11] 3,986,625
[45] Oct. 19, 1976

[54] LOG TURNING APPARATUS

[75] Inventor: Philip Nilsson, Soderhamn, Sweden

[73] Assignee: Kockum Industri Aktiebolag, Sweden

[22] Filed: Aug. 6, 1974

[21] Appl. No.: 495,186

[30] Foreign Application Priority Data
Aug. 8, 1973  Sweden .............................. 7310861

[52] U.S. Cl. .............................................. 214/339
[51] Int. Cl.² ......................................... B65H 51/26
[58] Field of Search ........................... 214/338, 339; 144/208 F; 29/2.16; 51/79

[56] References Cited
UNITED STATES PATENTS

| | | |
|---|---|---|
| 3,587,685 | 6/1971 | Morey et al. ............... 144/208 F X |
| 3,774,660 | 11/1973 | Morey et al. ................ 144/208 F |
| 3,854,614 | 12/1974 | Albrecht ............................ 214/339 |

Primary Examiner—Robert G. Sheridan
Attorney, Agent, or Firm—Hill, Gross, Simpson, Van Santen, Steadman, Chiara & Simpson

[57] ABSTRACT

A log turning apparatus comprising at least two rotary driven rollers on opposite sides of the path of the logs. The rollers are carried on the ends of two arms which are supported for pivoting about a vertical axis, and the rollers are biased in direction towards each other to bear against a log between them and to advance the log lengthwise as the rollers rotate. The rollers are adjustable to impart a turning motion to the log around its axis simultaneously with the advancement of the log. The adjustment of the rollers takes place by synchronously inclining the rollers in mutually opposite directions around an axis perpendicular to the feed path of the logs.

4 Claims, 4 Drawing Figures

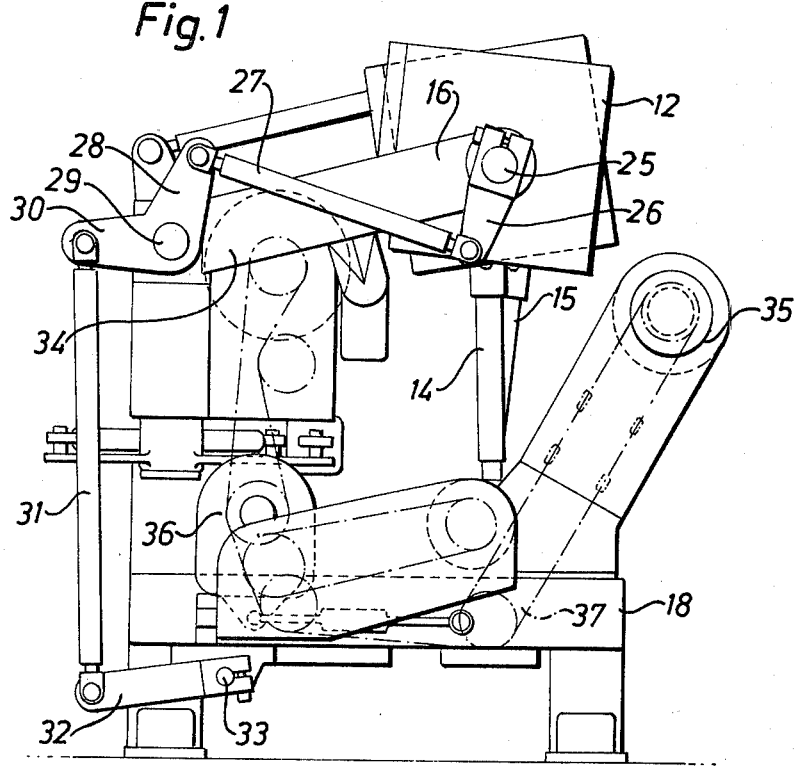
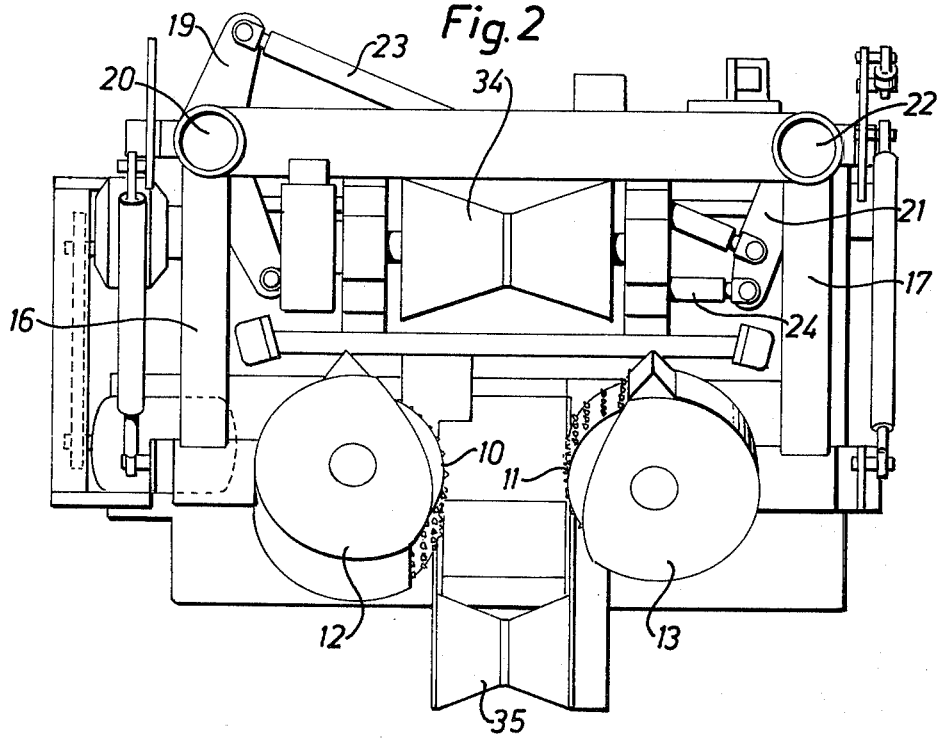

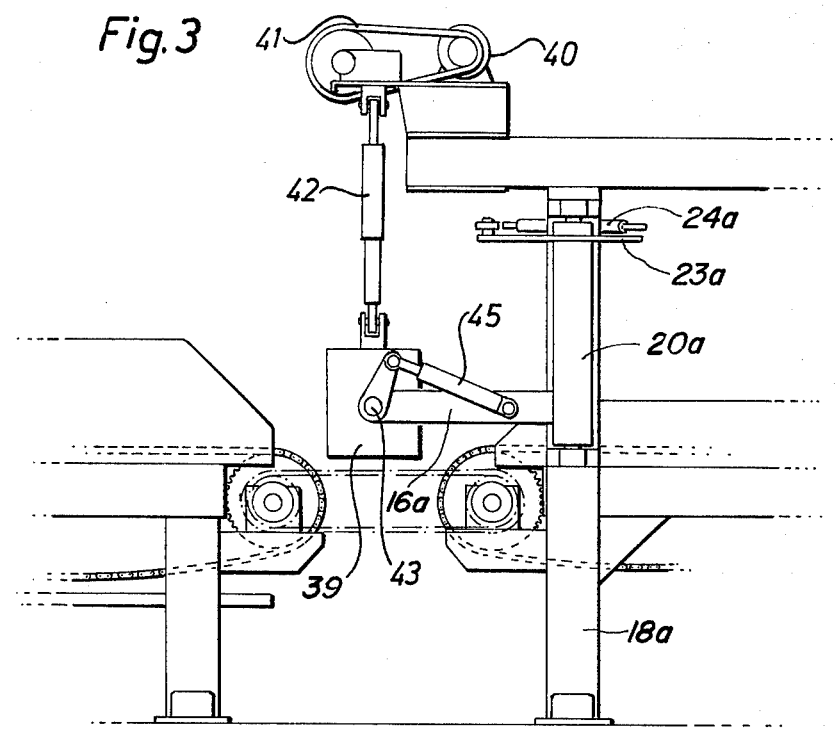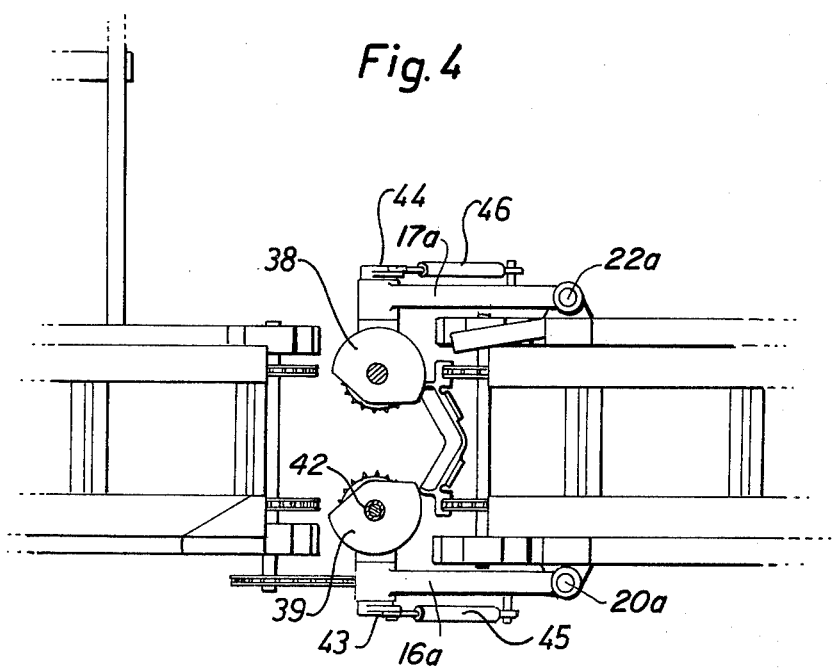

LOG TURNING APPARATUS

This invention relates to a log turning apparatus.

BACKGROUND OF THE INVENTION

When sawing logs, it is desirable that the logs are advanced to the sawing machine in a position such that the logs, as seen from above, are as straight as possible. The same requirement exists also in connection with so-called planreducing of logs, where two opposite sides of the log are made planar as a preparatory step to a subsequent sawing operation. This presents no problem when using so-called log trucks for advancing the logs, since the trucks are constructed to enable the logs to be turned by gripping means on said trucks, before the logs are fed to the saw or plan-reducer.

Log trucks cannot be used to feed logs in modern high-speed saw mills, however, since at each infeed operation the truck must return and grip the rear end of the new log. Consequently, the logs cannot be fed through the saw in end-to-end relationship, as is naturally desired.

PRIOR ART

Infeed conveyors have been proposed which permit the logs to be fed in an end-to-end relationship and which are so arranged that the logs are turned, at least to some extent, so that they are straight as seen from above. In the case of these known conveyors, the logs are supported at their front and rear ends, the intention being that the logs thus suspended shall turn themselves to the desired position due to gravity. This proposal has not provided a satisfactory answer to the problem of rotary adjustment of the logs.

SUMMARY OF THE INVENTION

According to the invention there is provided a log turning apparatus comprising at least two rotary driven rollers disposed on opposite sides of the path of the logs. The rollers are carried on the ends of two arms which are supported for pivoting about a vertical axis. The rollers are biased in direction towards each other to bear against a log between them and to advance the log longitudinally thereof as the rollers rotate, said rollers being adjustable so as to impart to said log, at least transitionally, a turning motion around its longitudinal axis in one or the other direction, simultaneously with the longitudinal advancement of the log. The arms extend generally horizontally in the direction of log travel.

Preferably, the said rollers comprise two rollers disposed one on each side of the path of the logs and being rotatably driven in mutually opposite directions around their respective axis of rotation, said axis of rotation being generally vertical in a normal, neutral feed position of the apparatus, and wherein means are provided for adjusting the positioning of the rollers by synchronously inclining said axis of rotation in mutually opposite direction around a pivot axis located perpendicularly to the feed path of the logs so as to thereby cause the logs to be turned in one or the other direction.

IN THE DRAWINGS

FIG. 1 is a side view of a log turning apparatus according to one aspect of the invention;

FIG. 2 is a plan view of the apparatus shown in FIG. 1;

FIG. 3 is a side view of a second embodiment of a log turning apparatus according to the invention;

FIG. 4 is a plan view of the apparatus shown in FIG. 3.

DESCRIPTION OF PREFERRED EMBODIMENTS

The log turning apparatus in FIGS. 1 and 2 comprises two feed rollers 10,11 which are mounted for rotation in respective housings 12,13. Each of the rollers 10,11 is driven by its respective shaft 14,15, which, in turn, is driven by gears (not shown). The shafts 14,15 are provided at each end thereof with universal joints, to permit oblique positioning of the rollers 10,11, as is described in more detail hereinafter.

Each roller 10,11 is supported at the end of an arm 16,17 which arms are pivotally mounted in a frame 18 in a manner such that the rollers 10,11 may be swung towards and away from each other, more specifically in a manner such that the two rollers 10,11 are always spaced the same distance apart from a central, vertical center plane through the apparatus, as described in more detail hereinafter.

The rollers 10,11 and the roller housings 12,13 respectively are so mounted at the ends of the arms 16,17 that the rollers 10,11 can be adjusted to different inclined positions relative to said vertical plane. For normal feed, the rollers 10,11 are positioned with their shafts fully vertical. If, however, a log shall be turned, the rollers 10,11 are inclined in mutually opposite directions so that, in addition to advancing the log said log is also turned in one or the other direction, depending upon the inclined position of the rollers 10,11. The rollers 10,11 are inclined simultaneously to the same angle of inclination.

The horizontally pivotable arm 16 extends generally parallel to the log path and is non-rotatably connected with an arm 19 which projects rearwardly from its vertical shaft 20, around which the arm 16 is arranged to pivot, and the horizontally pivotable arm 17 is also non-rotatably connected with an arm 21 which projects forwardly from the vertical shaft 22 around which the arm 17 is arranged to pivot. The two arms 19 and 21 are connected together by means of a link arm 23, which is pivotally connected to the two arms 19 and 21 at both ends thereof. Also pivotally connected to the arm 21 is the outer end of a piston rod 24 forming part of a pneumatic or hydraulic cylinder, not shown. As will be seen from FIG. 2, when the piston rod 24 is moved in either direction, the arm 21 is caused to pivot around the shaft 22, thereby causing corresponding pivoting of the arm 19, but in the opposite direction. The arms 16,17 are caused to accompany this pivoting movement. The purpose of the aforementioned cylinder is to urge the rollers 10,11 against a log fed between the rollers, and subsequent to the passage of the logs between the rollers to move the rollers to the rest position shown in the drawing (FIG. 2).

As mentioned above, the rollers 10,11 can be made to adopt an inclined position relative to the vertical plane, more specifically mutually opposed inclined positions. When inclining the rollers, the roller 10 and its housing 12, FIG. 1, for example, are rotated around a shaft 25 on which there is non-rotatably mounted a downwardly extending arm 26. The arm 26 is pivotally connected with one end of a link 27, the other end of which is pivotally connected with one arm 28 of a bellcrank lever, which is pivotally mounted on a horizontal shaft 29. The other arm 30 of the bellcrank lever is pivotally connected with one end of a generally vertically downwardly extending link 31, the other end of which is pivotally connected with an arm 32 which is non-rotatably mounted on a shaft 33. The shaft 33 has limited rotational movement in either direction in a manner not shown, and, as will be seen from FIG. 1, a rotary movement of the shaft 33 will cause a rotation of the shaft 25, so that the desired inclination of the roller 10 is obtained.

The roller 11 on the other side of the machine is operated by a second mechanism similar to that for inclining the roller 10. Like the first embodiment, the device of FIGS. 3 and 4 includes a pair of vertical shafts 20a, 22a on which a pair of arms 16a, 17a are pivoted and which arms are similarly interconnected by a link arm 23a for simultaneous movement in response to a single fluid actuator 24a. This second mechanism is also operated via the shaft 33. However, the arm of said second mechanism, which arm corresponds to the arm 26, does not project downwardly from the shaft on which it is non-rotatably mounted, but, instead, projects upwardly, which causes the rollers 10,11 to be inclined in mutually opposed directions during the aforedescribed movements of the mechanisms.

When the logs are fed through the apparatus, they rest on two so-called diabolo rollers 34,35, which are driven by a drive motor by means of a diagrammatically illustrated transmission 36 and 37 respectively.

The apparatus described with reference to FIGS. 1 and 2 operates in a highly satisfactory manner, although it has been found that falling pieces of bark and dirt are sometimes liable to disturb the operation of the apparatus. This problem is solved with the embodiment shown in FIGS. 3 and 4. The mode of operation of the second embodiment of the apparatus according to the invention is fully identical with that of the apparatus shown in FIGS. 1 and 2, and thus said apparatus comprises two synchronously rotatable feed rollers 38,39 arranged to be rotated in opposite directions by means of a common drive motor 40, namely via a diagrammatically illustrated transmission 41 comprising a telescopically extensible shaft 42 having universal joints arranged at both ends thereof, as shown in the case of one roller in side view in FIG. 3. With the embodiment of FIGS. 3 and 4, the rollers can also be inclined around horizontal shafts 43,44. With this embodiment, however, the rollers 38,39 are inclined by means of double acting hydraulic cylinders 45,46 which are so connected that when being inclined, the rollers are inclined to mutually opposed inclined positions so that the advancing log will be turned. It should be mentioned that the purely mechanical inclining mechanism shown in FIGS. 1 and 2 can also be used for inclining the rollers 38,39 of the embodiment shown in FIGS. 3 and 4, and that the hydraulic mechanism used to incline rollers in the embodiment of FIGS. 3 and 4 may be used with the embodiment of FIGS. 1 and 2. The principle differences between the embodiments of FIGS. 1, 2 and 3, 4, respectively, is mainly that with the last mentioned embodiment all the components of the drive and inclining mechanisms are located on a level with or above the feed rollers 38,39, while with the first described embodiment said components are located beneath the feed rollers 10,11.

I claim as my invention:

1. A log feeding and turning machine, comprising:
   a. a frame adapted to have logs pass longitudinally thereover along a log path;
   b. a pair of vertical shafts disposed on said frame at opposite sides of said path;
   c. a pair of generally horizontal arms carried at one end on said shafts, respectively, for pivoting about the axis of said shafts;
   d. a pair of drive rollers normally driven about vertical axes for feeding a log along said path, said drive rollers being supported on the other ends of said arms, respectively, for being tilted about a horizontal axis transverse to the log path;
   e. means connected to said arms for pivoting them toward and away from the log path; and
   f. means connected to said drive rollers for tilting said rollers in opposite directions about said horizontal axis for effecting turning of the log by a selected amount.

2. A machine according to claim 1, said arm pivoting means including a single actuator linked to both of said pivotable arms.

3. A machine according to claim 1, said horizontal tilt axis for one of said rollers being concentric with that of the other roller.

4. A machine according to claim 1, including a pair of guards substantially enclosing said rollers, but open at said log path, said guards being tiltable with said rollers.

* * * * *